United States Patent
Hardison

[11] 3,750,693
[45] Aug. 7, 1973

[54] SOLENOID OPERATED VALVE
[75] Inventor: Artson P. Hardison, Glendora, Calif.
[73] Assignee: XAR Industries Incorporated, City of Industry, Calif.
[22] Filed: Oct. 13, 1971
[21] Appl. No.: 188,807

[52] U.S. Cl............... 137/219, 137/220, 251/129, 251/140, 251/141
[51] Int. Cl............................................. F16k 31/06
[58] Field of Search................. 251/140, 141, 129; 137/219, 221, 220, 222

[56] References Cited
UNITED STATES PATENTS

| | | | |
|---|---|---|---|
| 3,243,013 | 3/1966 | Molin et al. | 251/141 X |
| 3,320,680 | 5/1967 | Paschke et al. | 251/140 X |
| 3,470,892 | 10/1969 | Barker | 251/141 X |
| 3,540,462 | 11/1970 | Renzi | 137/219 |
| 2,870,779 | 1/1959 | Thomiszer | 137/219 |
| 3,529,619 | 9/1970 | Drewry | 137/219 |
| 3,654,950 | 4/1972 | Hamm | 137/219 |
| 3,659,631 | 5/1972 | Rakoske | 251/141 X |
| 3,092,132 | 6/1963 | Guy et al. | 137/219 |
| 3,338,259 | 8/1967 | Tribe | 137/220 |
| 3,236,493 | 2/1966 | Richards | 137/202 X |

Primary Examiner—Alan Cohan
Assistant Examiner—Gerald A. Michalsky
Attorney—D. Gordon Angus, Donald D. Mon et al.

[57] ABSTRACT

A solenoid operated valve for use within an aircraft fuel area which permits the air to enter an air intake at a forwardly-located point in the aircraft and then to flow through the valve and into the fuel tank to pressurize it for positive expulsion of the fuel from the tank to the engine. The valve is equipped with spring bias means to maintain it in a fail-safe open position, so that only when the solenoid is actuated does the valve close and remove ram air pressure from the fuel in the tank. The valve is balanced so that differential pressures across it do not tend to open it, its operation being a function only of spring bias and energizing of a solenoid winding.

11 Claims, 5 Drawing Figures

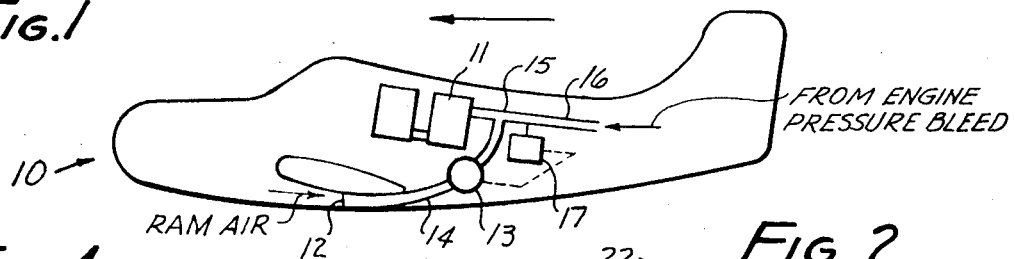
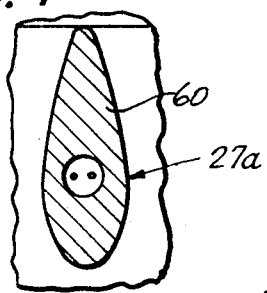
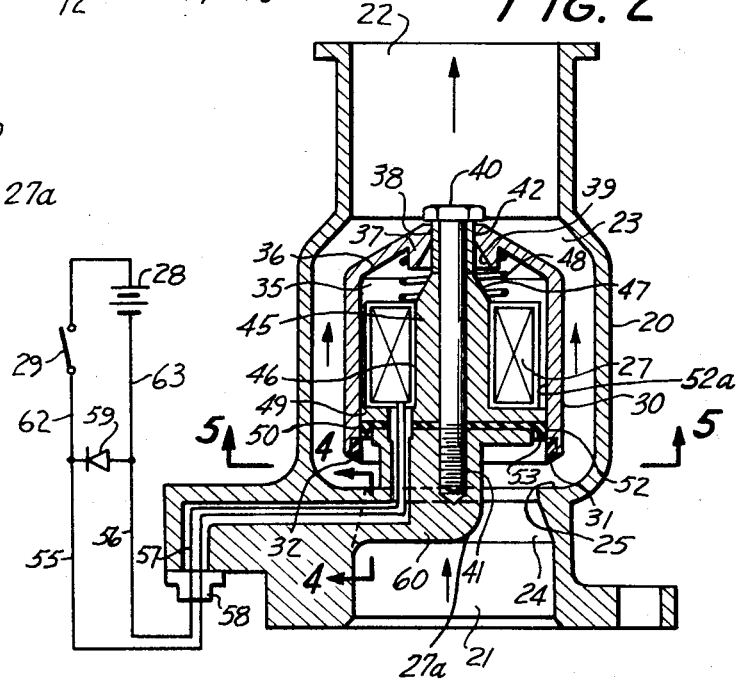
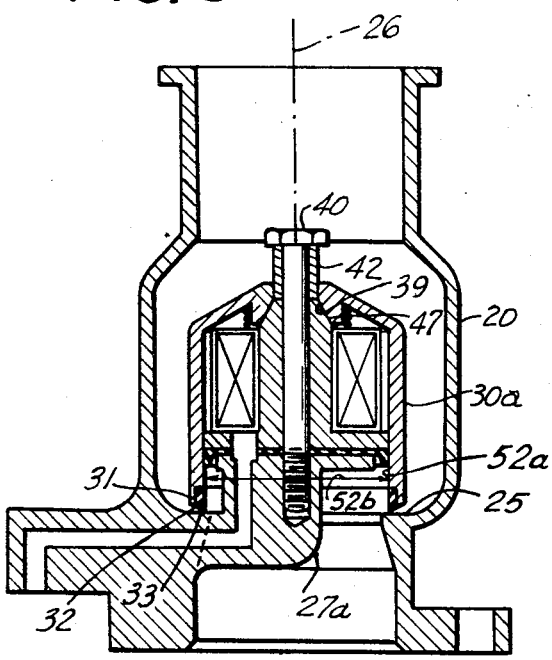
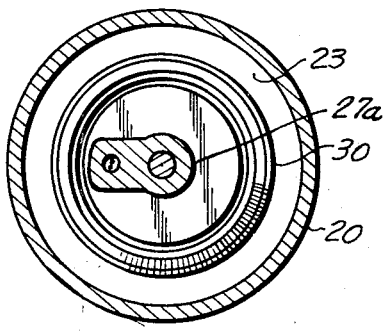
INVENTOR.
ARTSON P. HARDISON
BY
ATTORNEYS.

SOLENOID OPERATED VALVE

This invention relates to systems utilizing ram air pressure to pressurize aircraft fuel tanks, and further relates to a valve for controlling the flow of ram air into the fuel tanks.

An object of this invention is to provide a solenoid operated valve means to control the flow of ram air into fuel tanks.

Another object of the invention is to provide the said valve means with fail-safe structure that will maintain the valve in an open position unless electrical energy is applied for deliberate closing of the valve.

A further object of the invention is to provide means to suppress spark generation in electrical circuits of the valve to prevent explosive ignition due to electrical surges upon the breaking of electrical contacts in the switching systems used for actuating the valve.

Yet another object of the invention is to provide for sealing means on a poppet element to shut off the flow of air with minimum applied load, thereby minimizing the electrical current needed for sustained operation.

This invention variously includes features characterized by: air scoops which feed ram air to fuel cells to help force fuel into fuel lines; a solenoid valve which remains open unless activated electrically to close off the flow of ram air, the valve being concentrically constructed with a hollow cylindrical poppet element that houses a solenoid winding; and a peripheral washer which slidably engages inner surfaces of the poppet element to aid in balancing forces on the poppet element.

The above and other features of this invention will be fully understood from the following detailed description and the accompanying drawings, in which:

FIG. 1 is a side elevation, partly in cutaway cross-section, of the presently preferred embodiment of the invention in an aircraft;

FIG. 2 is a side elevation, partly in cutaway axial cross-section, of the valve in FIG. 1 shown in its open position;

FIG. 3 is a cross-section similar to that of FIG. 2, showing the valve in its closed position;

FIG. 4 is a cross-section taken on line 4—4 of FIG. 2; and

FIG. 5 is a cross-section taken on line 5—5 of FIG. 2.

A system utilizing the invention is shown in FIG. 1. An aircraft fuselage 10 carrying fuel tanks 11 has an air scoop 12 in the wheel well. Valve 13 according to the invention is connected in an air duct 14 which leads from the air scoop to a tee 15 that is connected to the fuel tanks. A pressurizing line 16 joins the tee and is in turn connected to one of the aircraft's engines to receive engine bleed air under pressure. This latter source of pressurized air normally pressurizes the tanks, and this invention provides an alternate source. The air scoop, constituting a source of ram air, is provided to pressurize the tanks in case of failure of the supply in line 16.

A pressure switch 17 is responsive to pressure in line 16. When sufficient pressure is present in line 16, switch 17 will be closed, energizing and closing valve 13 and thereby closing air duct 14 to flow. Should pressure fail in line 16, pressure switch 17 will open, de-energizing the solenoid, which will allow the valve to open and pass ram air pressure to the fuel tanks. A similar situation will result should the pressure switch fail.

This valve thereby provides a fail-safe in-flight source of air under pressure to pressurize the fuel tanks in the event of failure of the normal supply from the engine bleed.

The valve shown in FIG. 2 is the preferred embodiment for use in the illustrated fuel pressurization system. It has a body 20 which is provided with an air inlet port 21 and an air outlet port 22. The arrows shown within the ports indicate the direction of flow of the moving air. Such flow is also indicated in poppet chamber 23 by arrows.

Poppet chamber 23 encloses and contains the mechanism for operating the valve. It is radially enlarged to permit the flow of air around the mechanism. Chamber 23 is connected to the air inlet port by a venturi passage 24 which forms a part of the inlet port. The inlet port opens inside a circular poppet seat 25, which is a peripheral area formed around longitudinal axis 26 of the poppet chamber, and which faces upwardly into chamber 23 in FIG. 2. The longitudinal axis is normal to the poppet seat.

A solenoid mounting member 27a is supported by the body in the poppet chamber. It serves to mount a solenoid winding 27 and other associated parts. When energized from an electrical potential means 28, such as a battery, by the closing of a switch 29, the winding creates a field of magnetic flux that moves a tubular poppet element 30 toward poppet seat 25 to close the valve and the system to ram air flow.

The poppet element 30 carries on its end which faces poppet seat 25 a circular poppet seal 31. The poppet seal 31 has a conical face 32 which extends away from axis 26 as it extends away from seat 25. The poppet seal has a sealing edge 33 from which face 32 extends. Although the poppet seal 31 may be made of many different types of elastomeric or plastic materials, as well as of soft metallic materials, it has been found that the rubber-like substance sold under the trademark "Viton" is preferred for this application due to its resistance to fuel, to aging, and to the effects of flow upon its surfaces. The poppet seal 31 may conveniently be continuously bonded to the poppet element 30.

The poppet element is cup-shaped, and forms a cavity 35, in which the solenoid winding is located. The poppet element narrows at conical shoulder 36. An internal boss 37 is formed at the top of the poppet element, and it has a central longitudinal portion 38 and a tapered surface 39. Headed fastener means in the form of a bolt 40 passes through the bore 38, and its head retains the poppet element 30 to the solenoid mounting member, the bolt being threaded into tapped hole 41 therein. Bearing means 42 is carried by bolt 40 and provides a guide for the sliding axial movement of the poppet element. Bearing means 42 is non-slidably assembled to the shank of bolt 40, and bears against a solenoid core 45 which is also held by bolt 40. Core 45 has a cylindrical external surface 46, around which the solenoid winding is placed. Surface 46 of the core terminates in a tapered surface 47, which is in the form of a frustum of a cone that generally matches surface 39, whereby it shapes the magnetic field between itself and surface 39, and concentrates the lines of force.

A bias spring 48 is placed in compression between the solenoid support means (against the winding construction, in this case) and the poppet element to bias the valve to a normally open position which occurs when the solenoid winding is not energized. The core 45 terminates with a shoulder 49 at its lower end which forms a backing face 50.

Backing face 50 backs a peripheral washer 52 in the form of a cup washer. Washer 52 has a lip 53 which slides along the inner cylindrical wall 52a of the poppet element and seals the bottom end of chamber 35. Cylindrical wall 52a has a diameter 52b. The diameter of sealing edge 33 is preferably, and in this case is, equal to diameter 52b. Therefore, the effective diameter of washer 52 is also diameter 52b. Now note that washer 52 is rigidly retained by the solenoid mounting member. When the valve is closed, washer 52 isolates the upper part of the valve from inlet air pressure, and because the poppet seal has the same diameter, there is no unbalanced area between them at the air inlet port. On the other side of the washer and poppet seal, all surfaces are exposed to outlet pressure, again there being no unbalanced areas. Thus, operation of the valve will occur as a consequence only of force exerted by the bias spring or by the solenoid winding.

Electrical leads 55 and 56 enter the valve body 20 through a channel 57 to connect with the solenoid 27. A sealing member 58 prevents contamination of the electrical lead channel 57. A magnetic circuit is formed between surfaces 39 and 47.

A circuit, which is characterized in the instant invention by a diode 59 which is electrically connected in parallel across line 62 and line 63 of the series connected switch 29 and power source 28 joins the electrical leads 55 and 56 to act as a surge limiter for electrical current when the switch 29 is opened, thus preventing the formation of sparks at the contact points, which may be hazardous in fuel areas. This surge limitation also helps to prevent the throwing of circuit breakers and/or the overload of fuses within the aircraft electrical circuit. It also suppresses radio or electromagnetic interference with other circuits, such as navigation equipment.

The section 60 of the solenoid mounting means which stands in the path of the flow of air is formed with an airfoil configuration to minimize turbulence and pressure loss.

In operation, the system performs as follows:
The airplane during flight admits ram air through the air scoop 12 to the air duct 14 and to the valve 13 and through its air inlet port 21. The valve is held normally open by the bias spring 48. Air flows through the poppet chamber and the air outlet port to the to the tanks to pressurize them. When it is desired to remove pressurization from the fuel tanks from this source, switch 17 will be closed, energizing the solenoid, winding which acts upon the poppet element 30, to shift the poppet element 30 downward so the poppet seal bears against the poppet seat. The valve remains closed as long as the switch 17 remains closed. Upon opening the switch 17, the solenoid winding 27 is de-energized, and the poppet element moves away from the poppet seat under the urging of the bias spring 48. Thus, when there is sufficient pressure in line 16, valve 13 will be closed. It is possible of course to use a manual switch along with, or instead of the pressure switch if normal control is desired.

This invention provides a valve and a system for assuring the positive supply of fuel to the fuel pump even though the normal source of pressurization in the engine bleed, is disabled. It is fail-safe and efficient.

This invention is not to be limited by the embodiment shown in the drawings and described in the description, but only in accordance with the scope of the appended claims.

I claim:

1. An aircraft fuel tank pressurization system, comprising: an air scoop; an air duct connected to the air scoop and adapted to be connected to the fuel tank; and an electrically energizable solenoid valve in said air duct for selectively permitting or preventing the flow of air from the air scoop to the fuel tank, said valve comprising a body having a tubular poppet chamber with a longitudinal axis, an air inlet port and an air outlet port passing through the body and entering said poppet chamber, a circular poppet seat surrounding said air inlet port, the longitudinal axis being normal to the poppet seat, a solenoid mounting member supported by the body and extending into the poppet chamber, a solenoid core supported on the solenoid mounting member, a solenoid winding surrounding the solenoid core, the solenoid winding having an axis parallel to the said longitudinal axis, a tubular poppet element having an open end, and an inner cylindrical wall with an inside diameter and a longitudinal axis, said wall surrounding the solenoid winding and extending axially beyond the solenoid core on its end away from the air inlet port, a bearing member holding the poppet element to the solenoid mounting member for axially slidable movement toward and away from the poppet seat, a circular poppet seal carried by the poppet element on its open end facing the poppet seat, the poppet seal having an inside diameter, a peripheral washer carried by said solenoid mounting member, the outer periphery of said washer bearing against, and making a sliding fluid seal with, the cylindrical wall of the poppet element, a bias spring forcing the poppet element away from the poppet seat, a magnetic circuit being formed by the solenoid core and by the poppet element, whereby energizing the solenoid winding by passing an electrical current therethrough draws the poppet element toward the poppet seat so the poppet seal bears against the same to close the valve, the washer being disposed between the solenoid and the air inlet port, and the poppet element, poppet seal, poppet seat, and solenoid winding being coaxial.

2. A system according to claim 1 in which the inside diameters of the poppet seal and of the cylindrical wall of the poppet element are substantially equal, and in which the region inside of the poppet element and on the opposite side of the washer from the inlet port is vented to the air outlet port, whereby there is no substantial unbalanced force on the poppet element as a consequence of differential pressure between the inlet port and the outlet port.

3. A system according to claim 2 in which the poppet seal tapers outwardly from the longitudinal axis as it extends away from the air inlet port.

4. A system according to claim 2 in which that part of the solenoid mounting member which stands in the path of air flow between the air inlet port and the air outlet port has an airfoil configuration.

5. A system according to claim 1 in which a source of air pressure from another pressure source is connected to the tank, in which a pressure switch is provided that is responsive to pressure in this source, the pressure switch permits energizing of the solenoid when adequate pressure is provided by said source, and which prevents energizing otherwise, thereby permitting the valve to be opened by the bias spring to admit air from the air scoop.

6. A system according to claim 1 in which a venturi passage is formed in the air inlet port.

7. An electrically energizable solenoid valve for controlling the supply of ram air pressure to an aircraft fuel tank, comprising: a body having a tubular poppet chamber with a longitudinal axis, an air inlet port and an air outlet port passing through the body and entering said poppet chamber, a circular poppet seat surrounding said air inlet port, the longitudinal axis being normal to the poppet seat, a solenoid mounting member supported by the body and extending into the popper chamber, a solenoid core supported on the solenoid mounting member, a solenoid winding surrounding the solenoid core, the solenoid winding having an axis parallel to the said longitudinal axis, a tubular poppet element having an open end, and an inner cylindrical wall with an inside diameter and a longitudinal axis, said wall surrounding the solenoid winding and extending axially beyond the solenoid core on its end away from the air inlet port, a bearing member holding the poppet element to the solenoid mounting member for axially slidable movement toward and away from the poppet valve seat, a circular poppet seal carried by the poppet element on its open end facing the poppet seat, the poppet seal having an inside diameter, a peripheral washer carried by said solenoid mounting member, the outer periphery of said washer bearing against, and making a sliding fluid seal with, the cylindrical wall of the poppet element, a bias spring forcing the poppet element away from the poppet seat, a magnetic circuit being formed by the solenoid core and the poppet element, whereby energizing the solenoid winding by passing an electrical current therethrough draws the poppet element toward the poppet seat so the poppet seal bears against the same to close the valve, the washer being disposed between the solenoid and the inlet port.

8. A valve according to claim 7 in which the inside diameters of the poppet seal and of the cylindrical wall of the poppet element are substantially equal, and in which the region inside of the poppet element and on the opposite side of the washer from the inlet port is vented to the air outlet port, whereby there is no substantial unbalanced force on the poppet element as a consequence of differential pressure between the inlet port and the outlet port.

9. A valve according to claim 8 in which the poppet seal tapers outwardly from the longitudinal axis as it extends away from the air inlet port.

10. A valve according to claim 8 in which that part of the solenoid mounting member which stands in the path of air flow between the air inlet port and the air outlet port has an airfoil configuration.

11. A system according to claim 7 in which a venturi passage is formed in the air inlet port.

* * * * *